United States Patent
Min et al.

(10) Patent No.: US 9,736,779 B2
(45) Date of Patent: Aug. 15, 2017

(54) TECHNIQUES FOR MOBILE PLATFORM POWER MANAGEMENT USING LOW-POWER WAKE-UP SIGNALS

(71) Applicant: INTEL CORPORATION, Santa Clara, CA (US)

(72) Inventors: Alexander W. Min, Portland, OR (US); Minyoung Park, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 90 days.

(21) Appl. No.: 14/752,270

(22) Filed: Jun. 26, 2015

(65) Prior Publication Data

US 2016/0381638 A1    Dec. 29, 2016

(51) Int. Cl.
H04W 52/02    (2009.01)
H04W 88/02    (2009.01)

(52) U.S. Cl.
CPC ........ *H04W 52/0235* (2013.01); *H04W 88/02* (2013.01); *Y02B 60/50* (2013.01)

(58) Field of Classification Search
CPC . H04W 52/00; H04W 52/02; H04W 52/0235; H04W 84/12; H04W 88/02; Y02B 60/50
See application file for complete search history.

(56) References Cited

U.S. PATENT DOCUMENTS

| | | | | |
|---|---|---|---|---|
| 7,430,673 | B2 * | 9/2008 | Kardach | G06F 1/3203 713/300 |
| 8,156,353 | B2 * | 4/2012 | Tsai | G06F 1/3209 370/231 |
| 8,175,109 | B2 | 5/2012 | Nogueira-Nine et al. | |
| 8,286,014 | B2 * | 10/2012 | Han | G06F 1/3203 713/300 |
| 8,553,576 | B2 | 10/2013 | Park | |
| 8,761,065 | B2 * | 6/2014 | Stephens | G06F 1/3278 370/311 |
| 8,990,591 | B2 * | 3/2015 | Zou | G06F 1/3203 713/300 |
| 9,568,972 | B2 * | 2/2017 | Yarvis | G06F 1/3293 |
| 2004/0190467 | A1 | 9/2004 | Liu et al. | |
| 2005/0059347 | A1 | 3/2005 | Haartsen | |

(Continued)

OTHER PUBLICATIONS

Office Action for U.S. Appl. No. 14/279,820, mailed Sep. 15, 2015.

(Continued)

*Primary Examiner* — Tri H Phan
(74) *Attorney, Agent, or Firm* — Jason H. Vick; Sheridan Ross, PC

(57) ABSTRACT

Mobile platform power management is an important problem especially for battery-powered small form factor platforms such as smartphones, tablets, wearable devices, and Internet of Things (IOT) devices. A new low-power wake-up radio (LP-WUR) listens to the wireless medium for a wake-up signal with, for example, below 50 uw power consumption. The LP-WUR allows the mobile platform to completely turn off the main wireless radios, such as Wi-Fi, Bluetooth® (BT), Low-Energy Bluetooth® (BLE), and the like, and then selectively or opportunistically turn them on only when there is data to transmit or receive based on a wake-up signal.

25 Claims, 9 Drawing Sheets

(56) References Cited

U.S. PATENT DOCUMENTS

| | | | |
|---|---|---|---|
| 2005/0215274 A1* | 9/2005 | Matson | G06F 1/3203 455/522 |
| 2008/0044014 A1 | 2/2008 | Corndorf | |
| 2008/0108318 A1* | 5/2008 | Min | H04W 52/0229 455/343.1 |
| 2008/0162969 A1* | 7/2008 | Royannez | G06F 1/3203 713/323 |
| 2008/0247376 A1 | 10/2008 | Del Prado Pavon et al. | |
| 2010/0165896 A1 | 7/2010 | Gong et al. | |
| 2010/0314452 A1 | 12/2010 | Yeo et al. | |
| 2011/0103280 A1 | 5/2011 | Liu et al. | |
| 2011/0243267 A1 | 10/2011 | Won et al. | |
| 2011/0255454 A1 | 10/2011 | Hauser et al. | |
| 2012/0147800 A1 | 6/2012 | Park et al. | |
| 2012/0171954 A1 | 7/2012 | Rudland et al. | |
| 2012/0250596 A1 | 10/2012 | Park | |
| 2013/0007476 A1* | 1/2013 | Lake | G06F 1/3203 713/300 |
| 2013/0058267 A1 | 3/2013 | Aldaz et al. | |
| 2013/0083722 A1 | 4/2013 | Bhargava | |
| 2013/0145191 A1 | 6/2013 | Hung et al. | |
| 2013/0242826 A1* | 9/2013 | Black | H04W 52/0229 370/311 |
| 2013/0252657 A1 | 9/2013 | Kafle | |
| 2013/0254571 A1* | 9/2013 | Tian | H04W 52/0274 713/323 |
| 2014/0050133 A1 | 2/2014 | Jafarian et al. | |
| 2014/0086124 A1 | 3/2014 | Knowles | |
| 2014/0098724 A1 | 4/2014 | Park et al. | |
| 2014/0105186 A1 | 4/2014 | Park et al. | |
| 2014/0112224 A1 | 4/2014 | Jafarian et al. | |
| 2014/0112229 A1 | 4/2014 | Merlin et al. | |
| 2014/0112246 A1 | 4/2014 | Park et al. | |
| 2014/0120962 A1* | 5/2014 | Merlin | H04W 68/02 455/466 |
| 2014/0153507 A1 | 6/2014 | Yang et al. | |
| 2014/0161118 A1 | 6/2014 | Lyer et al. | |
| 2014/0185501 A1 | 7/2014 | Park et al. | |
| 2014/0185502 A1 | 7/2014 | Kenney et al. | |
| 2014/0211678 A1 | 7/2014 | Jafarian et al. | |
| 2014/0223212 A1* | 8/2014 | Wu | G06F 1/28 713/323 |
| 2014/0269462 A1 | 9/2014 | Jia et al. | |
| 2014/0269543 A1 | 9/2014 | Li et al. | |
| 2014/0269994 A1 | 9/2014 | HomChaudhuri et al. | |
| 2014/0302849 A1 | 10/2014 | Palin et al. | |
| 2015/0139051 A1 | 5/2015 | Gonia | |
| 2015/0208349 A1 | 7/2015 | Ramamurthy et al. | |
| 2015/0334650 A1* | 11/2015 | Park | H04W 84/12 370/311 |
| 2016/0057703 A1* | 2/2016 | Benoit | H04W 8/005 370/311 |

OTHER PUBLICATIONS

U.S. Appl. No. 14/998,242, filed Dec. 26, 2015, Azizi et al.
U.S. Appl. No. 14/864,917, filed Sep. 25, 2015, Min et al.
International Search Report for International Application No. PCT/US2016/026190, mailed Aug. 2, 2016.
Written Opinion for International Application No. PCT/US2016/026190, mailed Aug. 2, 2016.
Office Action for U.S. Appl. No. 14/752,184, mailed Oct. 24, 2016.
Notice of Allowance for U.S. Appl. No. 14/279,820, mailed Oct. 24, 2016.
U.S. Appl. No. 14/279,820, filed May 16, 2014, Park.
U.S. Appl. No. 14/752,184, filed Jun. 26, 2015, Park et al.
Office Action for U.S. Appl. No. 14/279,820, mailed Apr. 8, 2016.
U.S. Appl. No. 15/413,726, filed Jan. 24, 2017, Park.
Office Action for U.S. Appl. No. 14/752,184, mailed Jan. 31, 2017.

* cited by examiner

TECHNIQUES FOR MOBILE PLATFORM POWER MANAGEMENT USING LOW-POWER WAKE-UP SIGNALS

TECHNICAL FIELD

An exemplary aspect is directed toward communications systems. More specifically an exemplary aspect is directed toward wireless communications systems and even more specifically to power management in wireless communications systems.

BACKGROUND

Wireless networks are ubiquitous and are commonplace indoors and becoming more frequently installed outdoors. Wireless networks transmit and receive information utilizing varying techniques. For example, but not by way of limitation, two common and widely adopted techniques used for communication are those that adhere to the Institute for Electronic and Electrical Engineers (IEEE) 802.11 standards such as the IEEE 802.11n standard and the IEEE 802.11ac standard.

The IEEE 802.11 standards specify a common Medium Access Control (MAC) Layer which provides a variety of functions that support the operation of IEEE 802.11-based wireless LANs (WLANs). The MAC Layer manages and maintains communications between IEEE 802.11 stations (such as between radio network cards (NIC) in a PC or other wireless device(s) or stations (STA) and access points (APs)) by coordinating access to a shared radio channel and utilizing protocols that enhance communications over a wireless medium.

IEEE 802.11ax is the successor to IEEE 802.11ac and is proposed to increase the efficiency of WLAN networks, especially in high density areas like public hotspots and other dense traffic areas. IEEE 802.11ax will also use orthogonal frequency-division multiple access (OFDMA). Related to IEEE 802.11ax, the High Efficiency WLAN Study Group (HEW SG) within the IEEE 802.11 working group is considering improvements to spectrum efficiency to enhance system throughput/area in high density scenarios of APs (Access Points) and/or STAs (Stations).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DESCRIPTION OF EMBODIMENTS

Mobile platform power management is an important problem especially for battery-powered small form factor platforms such as smartphones, tablets, wearable devices, and Internet of Things (IOT) devices. A new low-power wake-up radio (LP-WUR) listens to the wireless medium for a wake-up signal with below 50 uw power consumption. The LP-WUR allows the mobile platform to completely (or partly) turn off the main wireless radios, such as Wi-Fi, Bluetooth® (BT), Low-Energy Bluetooth® (BLE), and the like, and turn them on only when there is data to transmit or receive. This results in a significantly reduced mobile platform power consumption with operation of the LP-WURs illustrated in FIGS. 1 and 2. The main radio does not need to be completely turned off because there is a trade-off between power saving and wake-up latency. A system designer may choose to put the main radio in a very-low power state (but not completely turned off or disabled) so that the radio consumes minimal power and can be quickly woken up upon receipt of wake-up notification from the LP-WUR receiver. How a deep sleep-state that the main radio enters during a wake-up mode is a system design issue, and there are multiple design choices depending on, for example, the implemented architecture.

Figure 1:
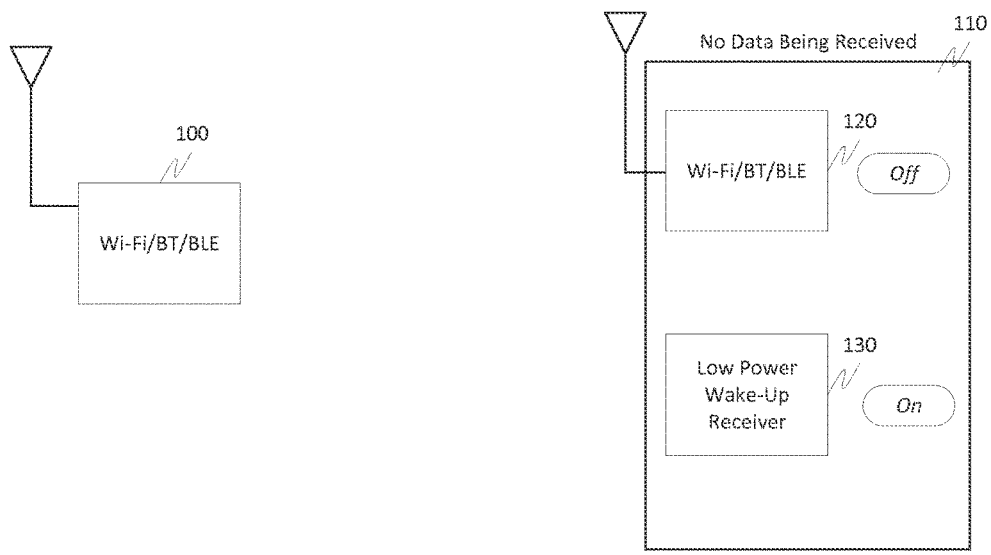
FIG. 1 illustrates a Low-Power Wake-Up Radio (LP-WUR) in a no data being received environment.
Figure 2:
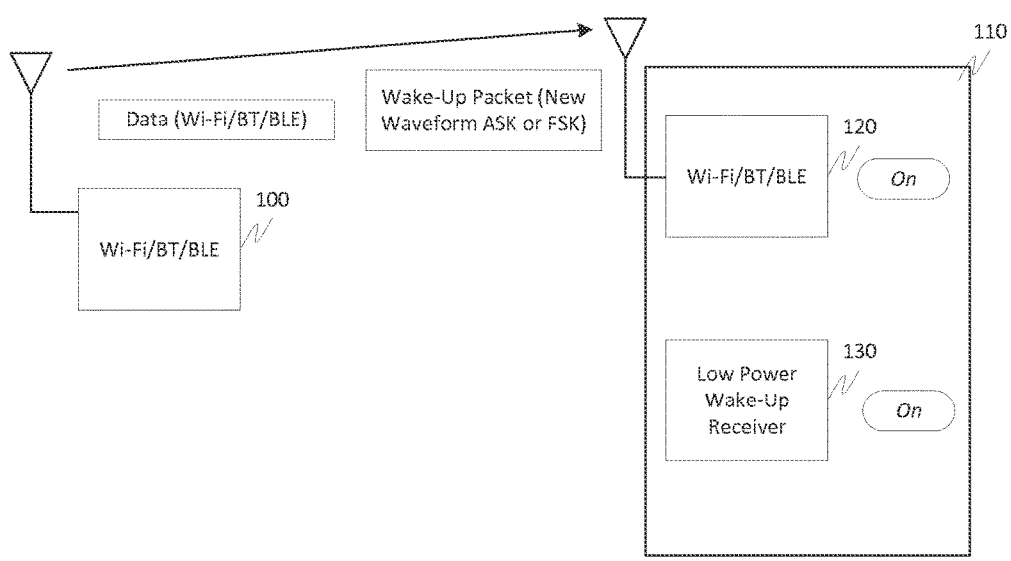
FIG. 2 illustrates a Low-Power Wake-Up Radio (LP-WUR) that is receiving data.

In particular, FIG. 1 includes a first Wi-Fi/BT/BLE device 100 such as an access point, and a second wireless device, such as a mobile device 110. The mobile device 110 includes a Wi-Fi/BT/BLE radio 120 and a low power wake-up receiver 130. When no data is being (or expected to be) received at the mobile device 110, as illustrated in FIG. 1, the Wi-Fi/BT/BLE radio 120 is off and the low power wake-up receiver 130 is on. However, as shown in FIG. 2, and when data is present, a wake-up packet causes the Wi-Fi/BT/BLE 120 and the low power wake-up receiver 130 to be on. More specifically, FIG. 2 shows a transient behaviour in which the main radio is turned on after receiving a wake-up packet, but the LP-WUR receiver is not turn off yet. In normal operation, the LP-WUR will be turned off after the main radio is turned on and fully functional.

As mentioned earlier, the LP-WUR can be turned off after waking up the main radio to save power. It is not typical (except some transient states) for both main radio and LP-WUR receiver to be turned on at the same time.

However, the techniques illustrated in FIGS. 1 and 2 can significantly reduce the radio (e.g., Wi-Fi/BT/BLE) power consumption when idle, and the use of the LP-WUR may have responsiveness/latency performance implications.

As one example, when a mobile platform is operating in a LP-WUR mode (with the main radio turned off), it is highly likely the whole mobile platform will also be in a low-power sleep state, such as in a S3 sleep state. This is because most mobile applications/workloads are communication-driven and involve both wireless data and packet exchanges when they are active. Therefore, the receiver may need to wake-up not only the main radio, but also the entire platform, including such resources as the CPU, memory, GPU, and the like, to provide better application-layer latency performance. However, if the data packet does not require application processing, waking up the entire platform may result in a waste of platform energy and battery life.

An exemplary technique disclosed herein opportunistically wakes-up the platform, thus improving latency and saving platform energy. One exemplary aspect allows the LP-WUR receiver in the mobile platform to wake-up either (i) only the main wireless radio (for better energy efficiency), or (ii) the whole platform (for better application performance).

One exemplary aspect has the LP-WUR wake-up the entire mobile platform as early as possible upon the reception of a wake-up signal from, for example, an AP (access point) or other device to minimize the latency induced by the platform wake-up delay. For this, the wake-up signal transmitter embeds an indication of the need for waking-up the entire mobile platform when it sends a wake-up signal. This in turn reduces the time between when the mobile platform wakes up and a subsequently received packet that requires processing by the whole mobile platform.

For example, if the data packets (following a wake-up signal) require application processing, then the transmitter can request the receiver to wake-up not only the main radio but also the entire mobile platform at the same time. Otherwise, if the data does not require application processing (e.g., an IEEE 802.11 beacon), then the transmitter can request the receiver to wake-up only the main radio (e.g., Wi-Fi/BT/BLE), but not the entire platform. By doing this, the receiver can reduce latency while minimizing platform energy consumption.

The current LP-WUR, as shown in FIGS. 1 and 2, either (i) wakes-up only the main radio, and then later when the main radio receives a data packet, the LP-WUR wakes-up the rest of the platform, or (ii) wakes-up both the main radio and the entire platform regardless of the actual needs for waking-up the platform.

This will result in either (i) additional latency for the main radio to wake-up the rest of the platform after receiving the data packet, or (ii) a waste of platform energy if the received packet only needs to be processed at the main radio. One exemplary aspect disclosed herein addresses this problem by allowing the LP-WUR transmitter and receiver to exchange necessary information so that the receiver can adaptively wake-up the platform in more efficient manner.

One example use case would be in a smartphone environment with a LP-WUR transmitter which sends a wake-up signal to a smart watch with a LP-WUR receiver. Here the LP-WUR transmitter can request the LP-WUR receiver in the smart watch to wake-up the entire platform only when a data packet following a wake-up packet has a packet with a payload for a specific application running on the smart watch (e.g., an email notification or tweet message).

Figure 3:
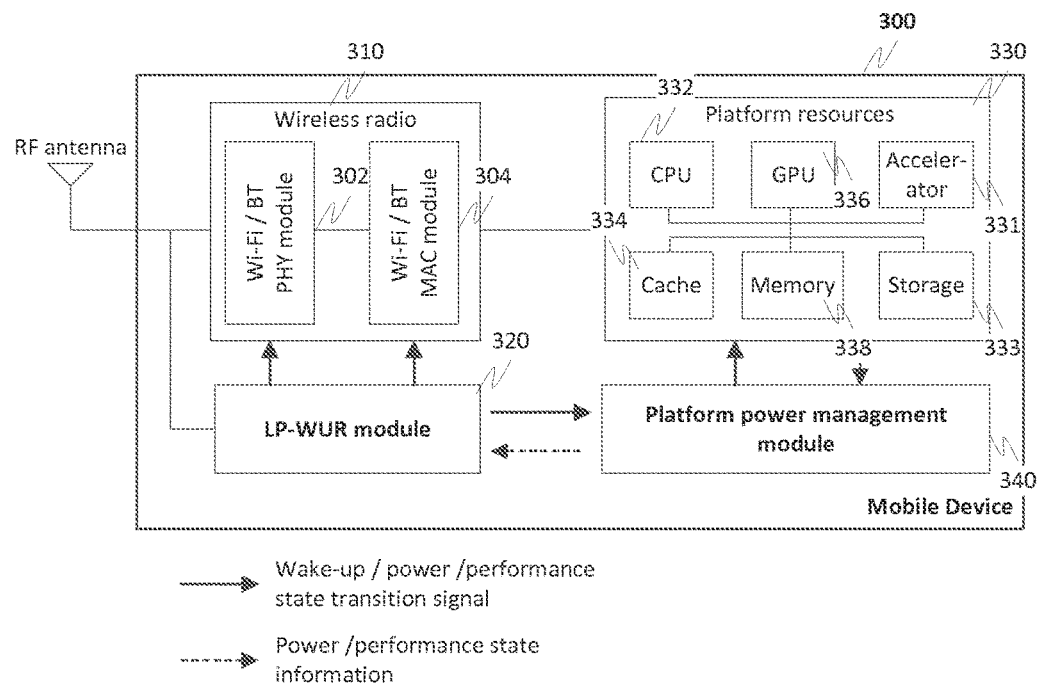
FIG. 3 illustrates a functional block diagram of a wireless device, such as a mobile device.

FIG. 3 illustrates an exemplary functional block diagram of a wireless device 300, such as a mobile device, that can be used with any one or more of the aspects disclosed herein. In particular, this exemplary architecture allows the LP-WUR module 320 to communicate with a platform power management module 340 to exchange platform power/performance state information and commands for power/performance state transitions. This platform state information may include not only power states (e.g., sleep state), but also performance states (e.g., CPU frequency) when active.

FIG. 3 illustrates an exemplary wireless/mobile device 300 that includes a wireless radio 310, which includes a Wi-Fi/Bluetooth PHY module 302, a Wi-Fi/BT MAC module 304, an LP-WUR module 320, and one or more platform resources 330, such as CPU 332, cache 334, GPU 336, memory 338, accelerator 331 and storage 333. The mobile device 300 also includes a platform power management module 340. The wireless/mobile device 300 as illustrated in FIG. 3 including arrows illustrating the wake-up/power/performance state transition signals/information between the elements as well as power state information signals between the various elements. Specifically, the LP-WUR module 320 can send a wake-up/power/performance state transition signal to the Wi-Fi/BT module 302 and a wake-up/power/performance state transition signal to the Wi-Fi MAC module 304. The LP-WUR module 320 can also send a wake-up/power/performance state transition signal to the platform power management module 340 which can send a wake-up/power/performance state transition signal to one or more of the platform resources 330.

The platform power management module 340 can send a power/performance state information signal/information to the LP-WUR module 320.

Figure 4:
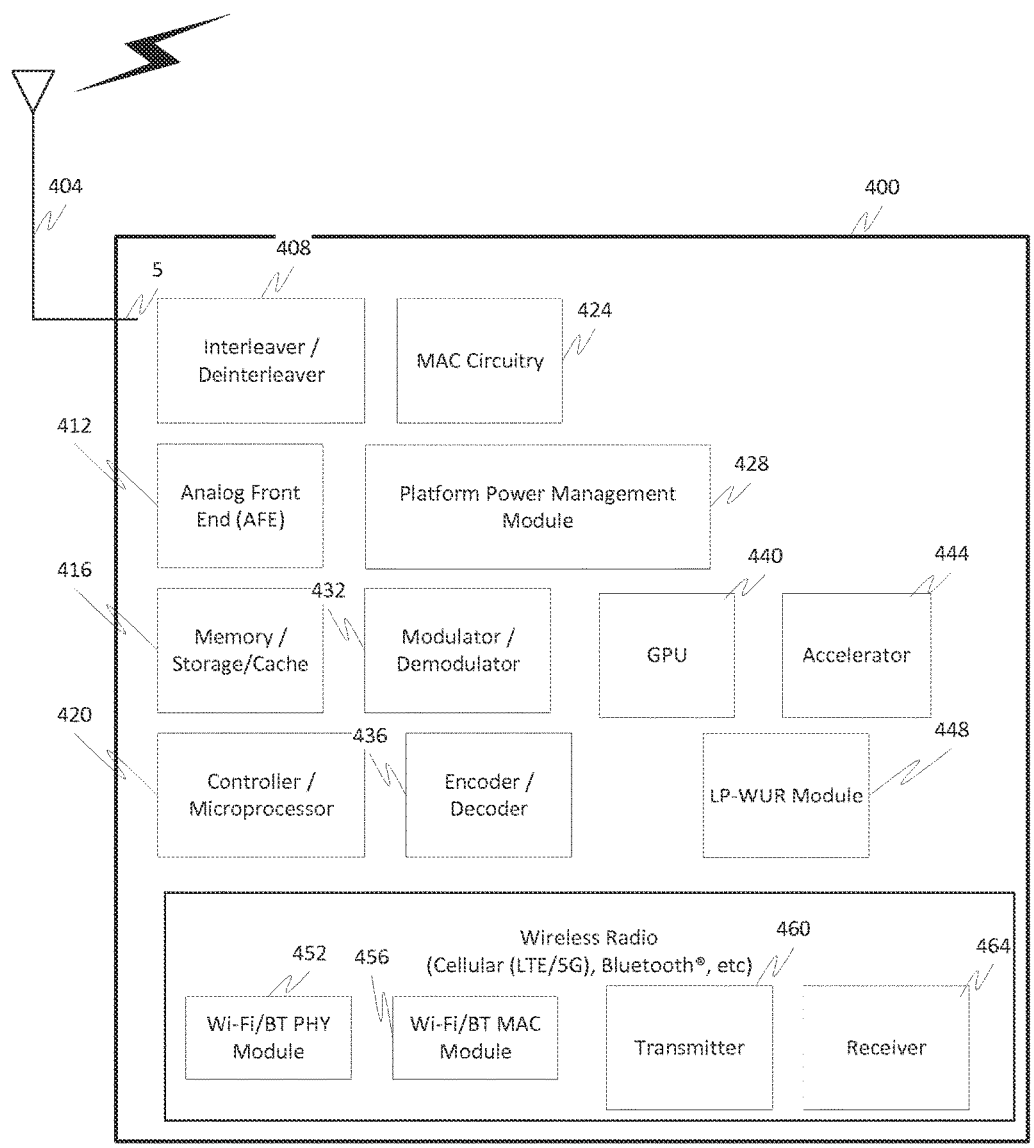
FIG. 4 illustrates a hardware block diagram of an exemplary wireless device such as a mobile device.

FIG. 4 illustrates an exemplary hardware diagram of a device 400, such as a wireless device, mobile device, access point, or the like, that is adapted to implement the technique(s) discussed herein.

In addition to well-known componentry (which has been omitted for clarity), the device 400 includes one or more antennas 404, an interleaver/deinterleaver 408, an analog front end (AFE) 412, memory/storage 416, controller/microprocessor 420, transmitter 460, modulator/demodulator 432, encoder/decoder 436, MAC Circuitry 424, receiver 464, and optionally one or more radios such as a cellular radio/Bluetooth®/Bluetooth® low energy radios. The various elements in the device 400 are connected by one or more links (not shown, again for sake of clarity).

The device 400 can have one more antennas 404, for use in wireless communications such as multi-input multi-output (MIMO) communications, Bluetooth®, etc. The antennas 404 can include, but are not limited to directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users.

Antenna(s) 404 generally interact with an Analog Front End (AFE) 412, which is needed to enable the correct processing of the received modulated signal. The AFE 412 can be located between the antenna and a digital baseband system in order to convert the analog signal into a digital signal for processing.

The device 400 can also include a controller/microprocessor 420 and a memory/storage 416. The device 400 can interact with the memory/storage 416 which may store information and operations necessary for configuring and transmitting or receiving the information described herein. The memory/storage 416 may also be used in connection with the execution of application programming or instructions by the controller/microprocessor 420, and for temporary or long term storage of program instructions and/or data. As examples, the memory/storage 420 may comprise a computer-readable device, RAM, ROM, DRAM, SDRAM, and/or other storage device(s) and media.

The controller/microprocessor 420 may comprise a general purpose programmable processor or controller for executing application programming or instructions related to the device 400. Furthermore, the controller/microprocessor 420 can perform operations for configuring and transmitting information as described herein. The controller/microprocessor 420 may include multiple processor cores, and/or implement multiple virtual processors. Optionally, the controller/microprocessor 420 may include multiple physical processors. By way of example, the controller/microprocessor 420 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The device 400 can further include a transmitter 460 and receiver 464 which can transmit and receive signals, respectively, to and from other wireless devices or access points using the one or more antennas 404. Included in the device 400 circuitry is the medium access control or MAC Circuitry 424. MAC circuitry 424 provides for controlling access to the wireless medium. In an exemplary embodiment, the MAC circuitry 424 may be arranged to contend for the wireless medium and configure frames or packets for communicating over the wireless medium.

The device 400 can also optionally contain a security module (not shown). This security module can contain information regarding but not limited to, security parameters required to connect the device to an access point or other device or other available network(s), and can include WEP or WPA security access keys, network keys, etc. The WEP security access key is a security password used by Wi-Fi networks. Knowledge of this code will enable a wireless device to exchange information with the access point. The information exchange can occur through encoded messages with the WEP access code often being chosen by the network administrator. WPA is an added security standard that is also used in conjunction with network connectivity with stronger encryption than WEP.

As shown in FIG. 4, the device 400 also includes a GPU 440, an accelerator 444 a platform power management module 428 a LP-WUR module 448 a Wi-Fi/BT PHY module 452 and a Wi-Fi/BT MAC module 456 that at least cooperate with the LP-WUR 448 and platform power management module 428 to achieve the more efficient operation discussed herein.

Figure 5:
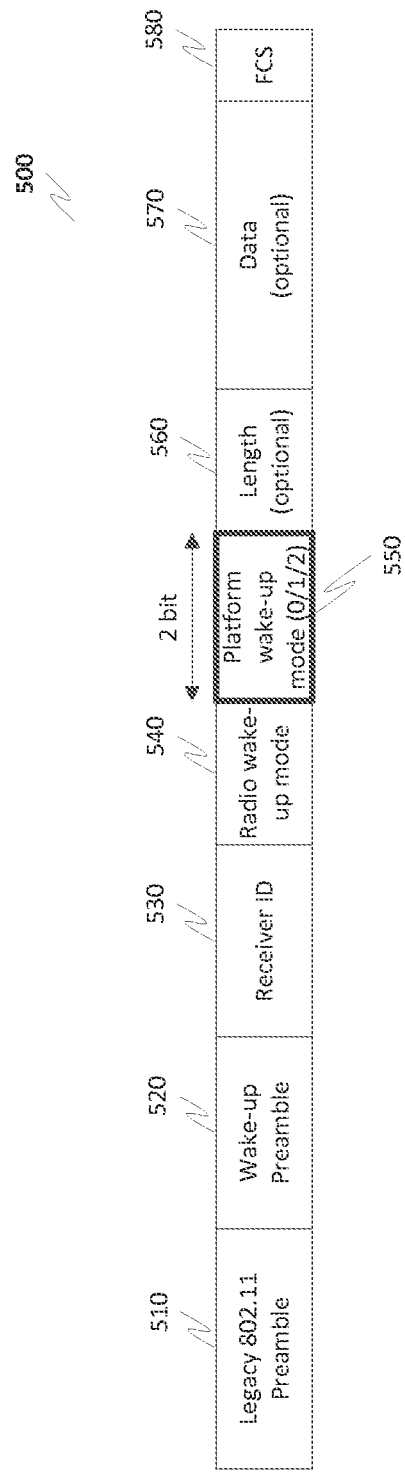
FIG. 5 illustrates an exemplary frame structure.

The exemplary frame format in FIG. 5 includes, for example, a legacy IEEE 802.11 preamble 510, a wake-up preamble 520, and optional receiver ID 530, an optional radio wake-up mode 540, an optional platform wake-up mode indicator 550 (here exemplary shown as two-bits in length, but capable of being any bit length), an optional length field 560, an optional data field 570, and an FCS (frame check sequence) 580. This exemplary frame format can be used by the LP-WUR module 448 and platform power management module 428 as discussed herein.

In this exemplary packet format 500, a new "platform wake-up mode (PW)" field 550 is introduced to indicate the need for waking-up the receiver platform for processing the data packet that follows. The PW field can be set to, for example, three different modes as follows:

PW=0 (no platform wake-up): this indicates that the data packet(s) that follows does not require the receiver platform to be woken-up and can be handled by the LP-WUR module 448 and/or PHY/MAC modules 452/456.

PW=1 (platform wake-up needed): this indicates that the data packet(s) that follows does require the receiver platform to be woken-up.

PW=2 (platform wake-up needed with performance mode): this indicates that the data packet that follows does require the receiver platform to be woken-up (e.g., one or more of the GPU 440, accelerator 444, processor 420, etc, and the platform needs to be in a high-performance state (e.g., CPU in a high frequency state and the CPU/platform should refrain from entering deep sleep states until it receives the data packet(s)).

The transmitter platform can consider multiple factors (and combinations of these factors) to decide whether the data packet to be transmitted requires the receiver platform in a high performance mode, such as, but not limited to:

i) Transmission queue occupancy at the application/OS/kernel networking stack and/or Wi-Fi driver/device of the transmitter: A higher transmission queue occupancy indicates a higher processing need at the receiver platform in the near future.

ii) Available channel bandwidth between the transmitter platform and the receiver platform: a higher available bandwidth indicates that the receiver platform may need higher performance to handle high throughput (e.g., greater than 100 Mbps).

iii) Any information from a Wi-Fi driver, application, OS, etc., that can be used to estimate the processing needs at the receiver.

An exemplary aspect is directed toward a proposed wake-up behaviour for a device that receives information and includes a receiver platform, with the receiver behaviour being governed by a combination of the LP-WUR module 350 and the platform power management module 346. In particular, an exemplary aspect defines the following behaviours for the LP-WUR transmitter and receiver componentry such as transmitter 328, receiver 342, within the wireless radio. In the LP-WUR transmitter, when there is data to transmit, the transmitter can operate in the following manner:

Send a wake-up signal with a platform wake-up ("PW") field set to, for example, 0, 1, or 2, depending on the type of packet the transmitter is scheduled to send. As will be appreciated, the field could be set to other values that are capable of conveying the same or similar information while not necessary using 0, 1, or 2. The transmitter can then optionally store the value of the PW field in, for example, a register or a memory, for future use.

Upon the reception of a wake-up ACK from the receiver platform, the transmitting platform can perform the following:

If the PW field was set to 1 or 2 and the wake-up ACK packet indicates a platform wake-up delay of X microseconds, then the transmitting platform can introduce an additional delay for the next packet transmission schedule to avoid potential re-transmissions.

If the PW filed was set to 0 or the wake-up ACK packet from the receiving platform indicates a platform wake-up delay of 0 microseconds, then the transmitting platform can schedule the next packet transmission without any additional delay.

For the LP-WUR receiver, operation at the receiving platform can be performed in the following manner:

Upon the reception of a wake-up signal the receiving platform can:

If the PW field is set to 0 (i.e., no need to wake-up the platform), then the receiving platform:

Wakes-up only the main radio
  Sends a wake-up ACK to the transmitting platform (the platform wake-up delay may be set to a value based on the active/sleep state of the platform)
If the PW field is set to 1 (i.e., need to wake-up the entire platform):
  i) If the platform is already in an active state (i.e., S0), then the receiver:
    Wakes-up only the main radio
    Sends a wake-up ACK to the transmitter platform with the platform wake-up delay set to 0 microseconds
  ii) If the platform is in a sleep state (e.g., S3), then the receiver:
    Wakes-up both the main radio and the platform
    Calculates the expected state transition time x microseconds
    Sends a wake-up ACK to the transmitter platform with the platform wake-up delay set to X microseconds
If the PW field is set to 2 (i.e., need to wake-up the entire platform and the platform needs to be in a higher performance state):
  i) If the platform was already in an active state (i.e., S0) then the receiver:
    Wakes-up only the main radio
    Signals the platform power management module 346 (e.g., a P-Unit or PMU) to increase the CPU frequency to a higher state (i.e., P0) and provide a small LTR (Latency Tolerance Reporting) to prevent the CPU cores from entering deep sleep states before receiving the data packet. Entering shallow sleep states, e.g., C1/C2, can be acceptable and may not have a significant impact on latency. However, the platform may not want to enter a deeper sleep state which might result in longer sleep to active state transition latency.
    Sends a wake-up ACK to the transmitter platform with the platform wake-up delay set 0 microseconds.
  ii) If the platform is in a sleep state (e.g., S3), then the receiver:
    Wakes-up both the main radio and the platform
    Signals the platform power management module 346 (e.g., the P-Unit or PMU) to increase CPU frequency to a higher state (i.e., P0) and provide and small LTR to prevent the CPU cores from entering sleep states.
    Calculates an expected state transition time x microseconds
    Sends a wake-up ACK to the transmitting platform with the platform delay set to X microseconds.

FIGS. 6-9 illustrate four different exemplary scenarios (two illustrating conventional techniques and two illustrating the techniques herein), to highlight exemplary benefits of the proposed adaptive/progressive wake-up methods.

Figure 6:
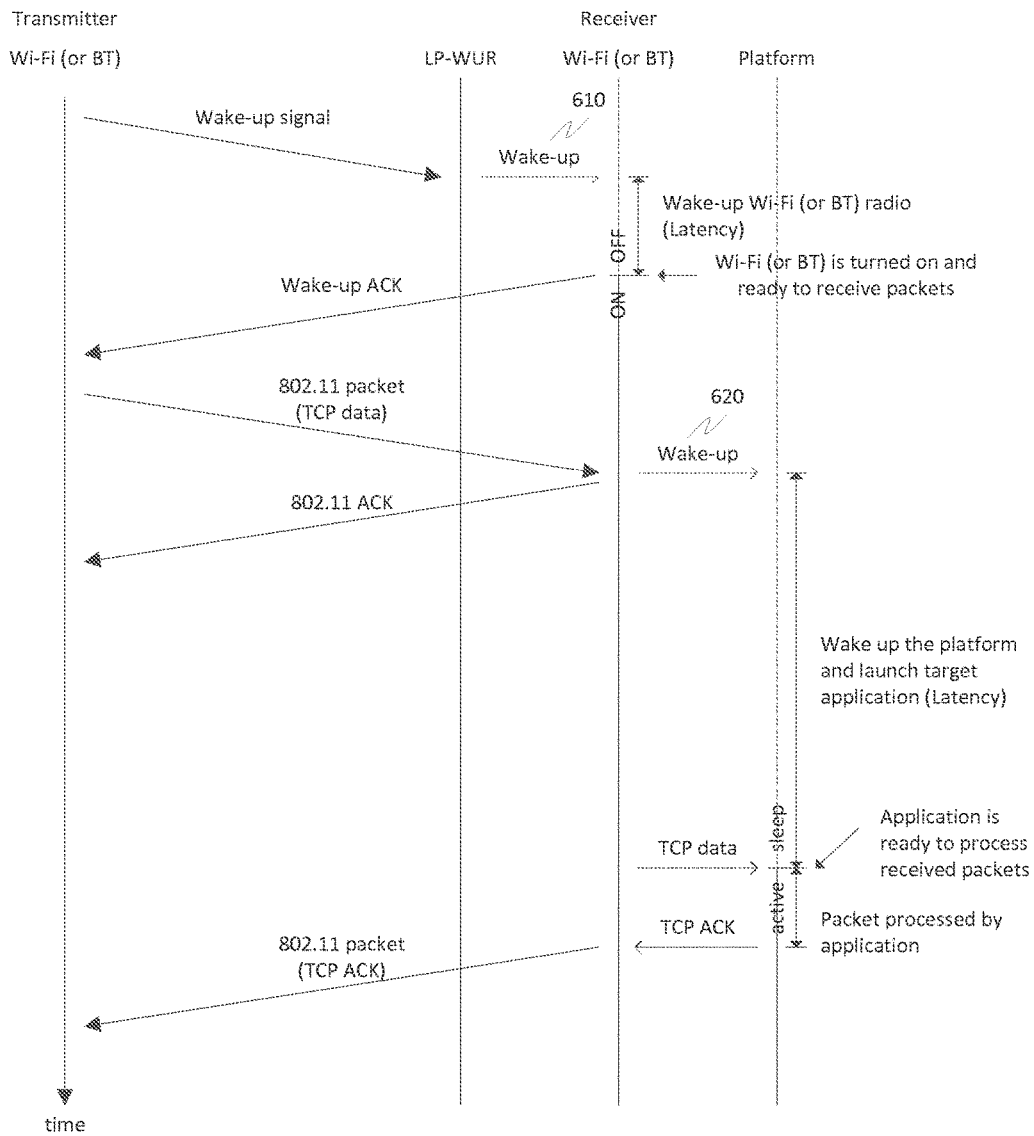
FIG. 6 illustrates communications between a transmitter and a receiver as well as receiver and platform operation.

In particular, FIG. 6 outlines a current approach without a platform wake-up. More specifically, in FIG. 6, the current wake-up approach does not wake-up the mobile platform. In this case, packet processing in the application layer may suffer from long latencies due to the delay in waking-up the platform. As shown in FIG. 6, and for the conventional wake-up behaviour, the receiver only wakes up the main radio when the receiver receives the wake-up signal—even if the platform is in a sleep state. The receiver wakes-up the platform only after the receiver receives the application data packet (TCP data) for the main radio—thus, the target application suffers from long delays introduced by waking-up the entire platform based on the IEEE 802.11 packet which results in potentially multiple packet re-transmissions as shown in the figure.

Figure 7:
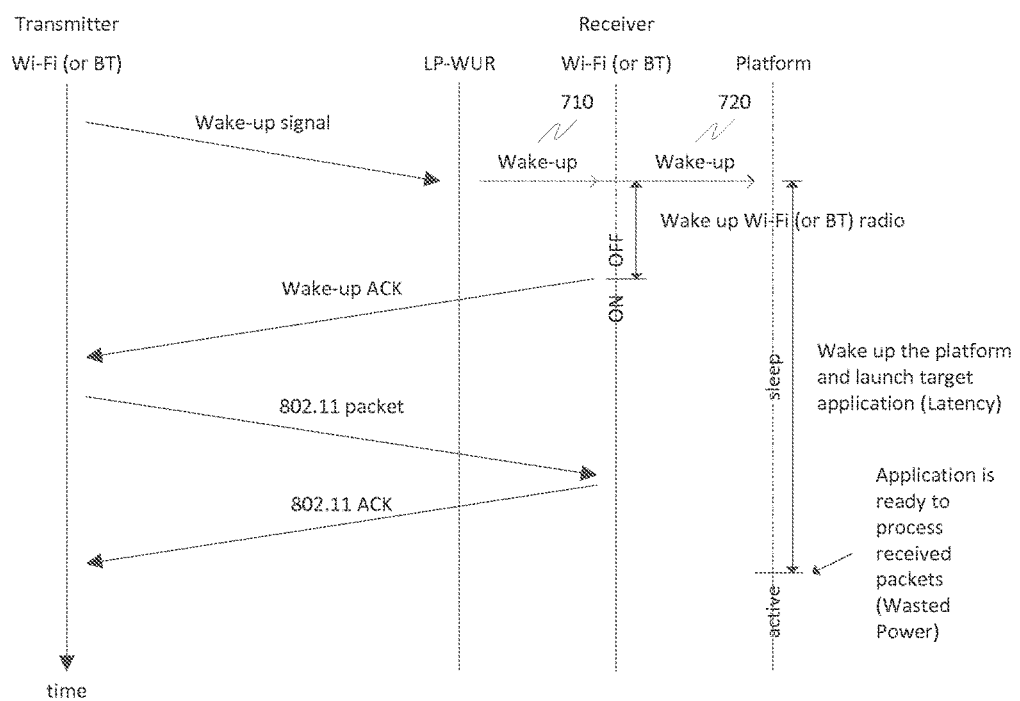
FIG. 7 illustrates communications between a transmitter and a receiver as well as receiver and platform operation.

FIG. 7 illustrates another conventional wake-up behaviour where the receiver wakes-up both the main radio and the receiver platform all the time. If, for example, the transmitted packet does not require the platform to be in an active state, the receiver wastes platform energy due to the unnecessary platform wake-up. As shown in FIG. 7, the platform is not needed to be woken-up due to the content/type of the IEEE 802.11 packet only being processed by the receiver.

Figure 8:
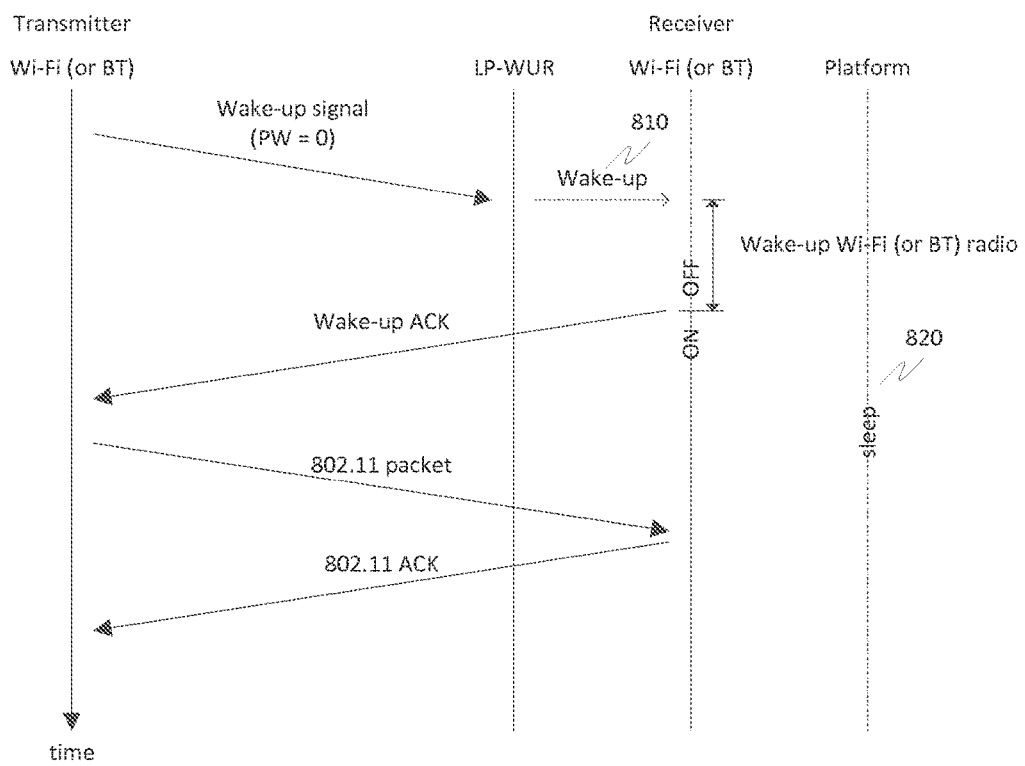
FIG. 8 illustrates exemplary communications between a transmitter and a receiver as well as receiver and platform operation.

FIG. 8 illustrates an exemplary method that includes an adaptive platform wake-up procedure. In particular, FIG. 8 illustrates the behaviour of the proposed scheme where the data packet for the main radio does not require application processing. In this scenario, the transmitter sets the PW field in the wake-up signal 810 to 0, and the receiver only wakes-up the main radio. Here, the platform stays in a sleep state 820 and hence does not waste platform energy.

Figure 9:
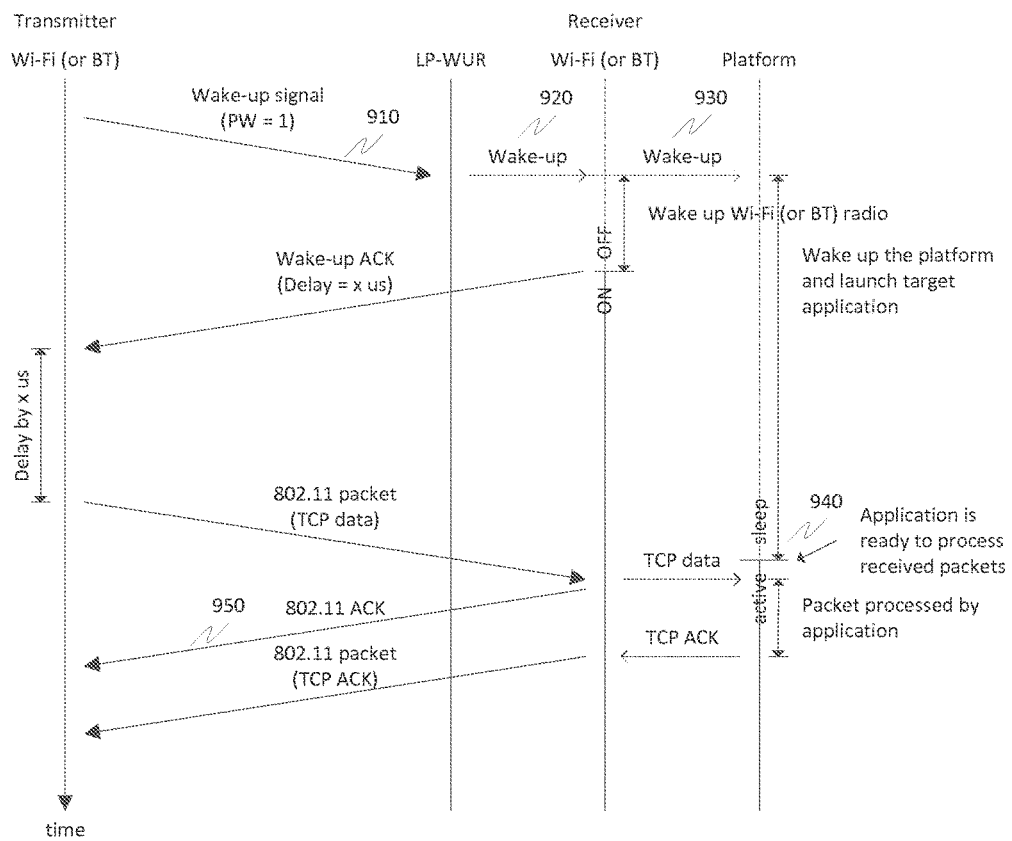
FIG. 9 illustrates alternative exemplary communications between a transmitter and a receiver as well as receiver and platform operation.

FIG. 9 illustrates an exemplary behaviour utilizing the proposed scheme where the date packet for the main radio does require application processing. Here, the transmitter sets the PW field in the wake-up signal 910 to 1 or 2, and the receiver wakes-up both the main radio 920 and the platform 930 at the same time (or substantially the same time), thereby hiding platform wake-up delay and reducing packet processing delay 940. The receiver can also calculate an expected platform wake-up time and optionally send the calculated timing information to the transmitter in a wake-up ACK packet 950 so that the transmitter can delay packet transmission until the receiver is ready and avoid potential re-transmissions. Table 1 below compares the performance implications of the conventional and proposed wake-up behaviours in terms of platform energy efficiency and latency performance.

TABLE 1

| | | Conventional (static) wake-up behavior | | Proposed |
|---|---|---|---|---|
| | | Only wake-up the main radio | Wake-up both radio and platform | (adaptive) wake-up behavior |
| Does data packet require application processing? | No | Desired (no energy wasted) | Energy wasted | Desired (no energy waste) |
| | Yes | Large latency | Desired (reduced latency) | Desired (reduced latency) |

Figure 10:
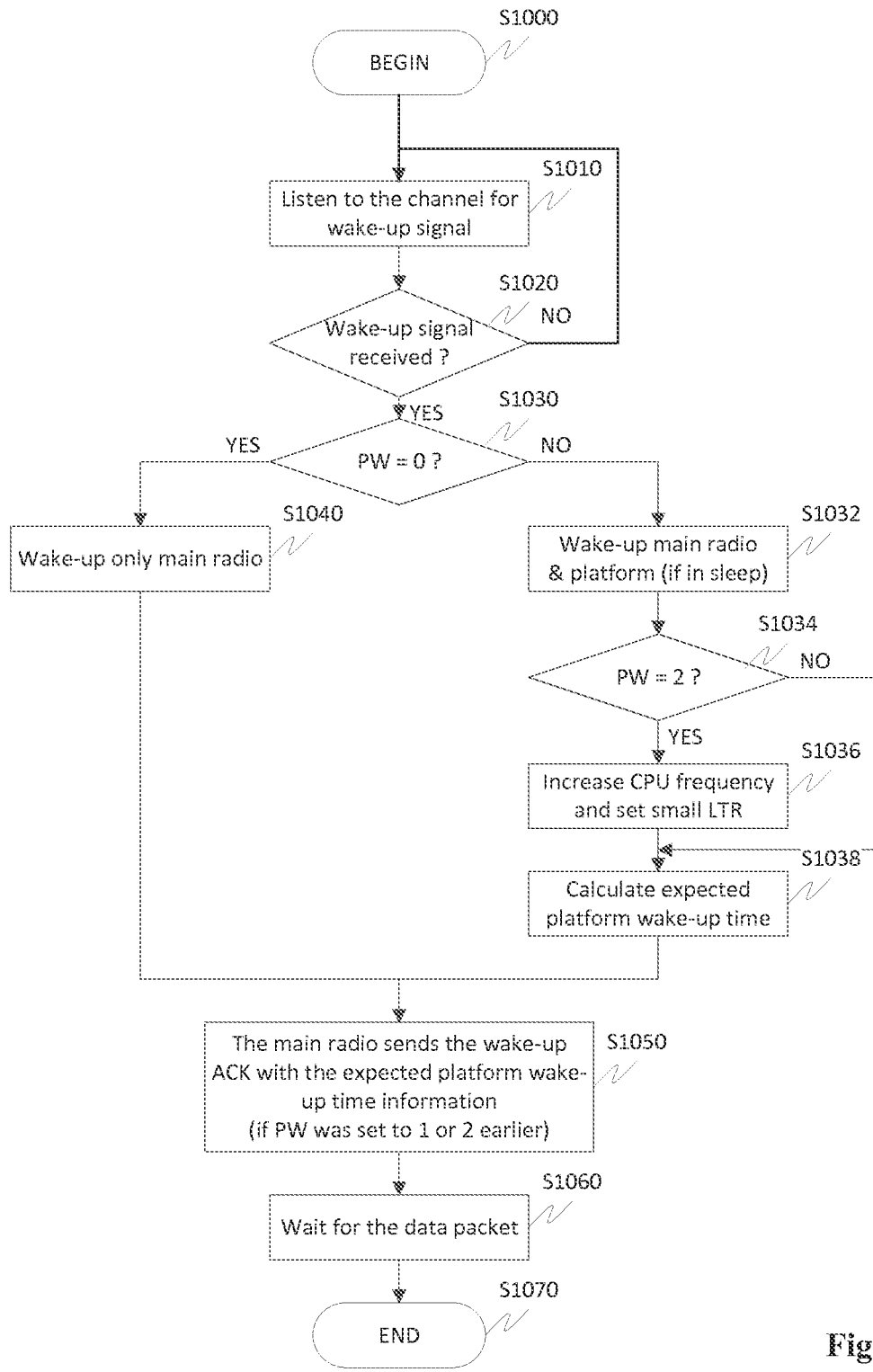
FIG. 10 is a flowchart illustrating an exemplary method for power management.

FIG. 10 outlines an exemplary methodology for opportunistic waking-up of a platform, such as a receiver, receiver radio or receiver platform. In particular, control begins in step S1000 and continues to step S1010. In step S1010 the receiver listens to the channel for a wake-up signal. Next, in step S1020, a determination is made as to whether the receiver has received a wake-up signal. If a wake-up signal has not been received, control jumps back to step S1010. Otherwise, control jumps to step S1030.

In step S1030, a determination is made as to whether the PW field is set to 0. If the PW field is set to 0, control continues to step S1040 with control otherwise continuing to step S1032.

In step S1040, the main radio is woken-up. Then, in step S1050, the main radio can optionally send a wake-up ACK with optional expected platform wake-up time information to the transmitter. This can done for example, if the PW was set to 1 or 2 above. Then, in step S1060, the receiver waits for the data packet with control continuing to step S1070 where the control sequence ends.

In step S1132, the main radio is woken up and the platform (if the platform is in a sleep mode). Next, in step S1134, a determination is made as to whether the PW is set to two. If the PW is not set to two, control jumps down to step S1138 with control otherwise continuing to step S1136. In step S1136, the CPU frequency is increased and a small LTR can be set. Then, in step S1138, the expected platform wake-up time optionally be calculated with control continuing to step S1150.

It should be appreciated, the various power management schemes discussed herein can have their specific features interchanged with one or more of the other power management schemes to provide, for example, further power savings, to alter latency and/or alter platform functionality. While the techniques discussed herein have been specifically discussed in relation to IEEE 802.11 systems, it should be appreciated that the techniques discussed herein can generally be applicable to any type of wireless communication standard, protocol, and/or equipment. Moreover, all the flowcharts have been discussed in relation to a set of exemplary steps, it should be appreciated that some of these steps could be optional and excluded from the operational flow without affecting the success of the technique. Additionally, steps provided in the various flowcharts illustrated herein can be used in other flowcharts illustrated herein.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links 5, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to power control in a wireless transceiver. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

Exemplary aspects are directed toward:
A wireless communications device comprising:
a platform power management module and a low-power wake-up radio configured to receive a wake-up signal and selectively wake-up one or more of a receiver radio and one or more receiver platform components.
Any of the above aspects, further comprising one or more of a transmitter, a receiver, a Wi-Fi PHY module, a Bluetooth PHY module, a Wi-Fi MAC module, a Bluetooth MAC module, one or more antennas, a processor and memory.
Any of the above aspects, wherein the wake-up signal indicates that the wireless communications device should: wake-up a main radio only, wake-up a main radio and one or more of the one or more receiver platform components, or wake-up the main radio and one or more of the one or more receiver platform components and increase a CPU frequency.
Any of the above aspects, wherein the platform power management module is further configured to set a small LTR (Latency Tolerance Reporting).
Any of the above aspects, wherein the platform power management module is further configured to determine an expected platform wake-up time.
Any of the above aspects, wherein the device is further configured to communicate the expected platform wake-up time to another device.
Any of the above aspects, wherein the expected platform wake-up time is communicated in a wake-up ACK.
Any of the above aspects, wherein the wake-up signal is in a packet with a platform wake-up mode field.
Any of the above aspects, configured to receive a packet including one or more of a legacy IEEE 802.11 preamble, a wake-up preamble, a receiver ID, a radio wake-up mode field, a length field, a data field and a FCS field.
Any of the above aspects, configured to one or more of save power and reduce latency at least based on the received wake-up signal.
A wireless communications method comprising:
receiving, at a wireless device, a wake-up signal; and
selectively waking-up one or more of a receiver radio and one or more receiver platform components.
Any of the above aspects, wherein the wireless device comprises one or more of a transmitter, a receiver, a Wi-Fi PHY module, a Bluetooth PHY module, a Wi-Fi MAC module, a Bluetooth MAC module, one or more antennas, a processor and memory.
Any of the above aspects, wherein the wake-up signal indicates that the wireless communications device should: wake-up a main radio only, wake-up a main radio and one or more of the one or more receiver platform components, or wake-up the main radio and one or more of the one or more receiver platform components and increase a CPU frequency.
Any of the above aspects, further comprising setting a small LTR (Latency Tolerance Reporting).
Any of the above aspects, further comprising determining an expected platform wake-up time.
Any of the above aspects, further comprising communicating the expected platform wake-up time to another device.
Any of the above aspects, wherein the expected platform wake-up time is communicated in a wake-up ACK.
Any of the above aspects, wherein the wake-up signal is in a packet with a platform wake-up mode field.
Any of the above aspects, further comprising receiving a packet including one or more of a legacy IEEE 802.11 preamble, a wake-up preamble, a receiver ID, a radio wake-up mode field, a length field, a data field and a FCS field.
Any of the above aspects, further comprising one or more of saving power and reducing latency at least based on the received wake-up signal.
A wireless communications device comprising:
means for receiving, at a wireless device, a wake-up signal; and
means for selectively waking-up one or more of a receiver radio and one or more receiver platform components.
Any of the above aspects, wherein the wireless device comprises one or more of a transmitter, a receiver, a Wi-Fi PHY module, a Bluetooth PHY module, a Wi-Fi MAC module, a Bluetooth MAC module, one or more antennas, a processor and memory.
Any of the above aspects, wherein the wake-up signal indicates that the wireless communications device should: wake-up a main radio only, wake-up a main radio and one or more of the one or more receiver platform components, or wake-up the main radio and one or more of the one or more receiver platform components and increase a CPU frequency.
Any of the above aspects, further comprising setting a small LTR (Latency Tolerance Reporting).
A non-transitory computer-readable information storage media, having stored thereon instructions, that when executed by a processor perform the method of any one or more of the above aspects For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, WiFi, LTE, 4G, Bluetooth®, WirelessHD, WiGig, WiGi, 3GPP, Wireless LAN, WiMAX, and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Corte™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has been provided systems and methods for power management. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A wireless communications device comprising:
a platform power management module and a low-power wake-up radio configured to receive a wake-up signal and selectively wake-up one or more of a receiver radio and one or more receiver platform components, wherein information contained in the wake-up signal specifies which of the one or more of the receiver radio and the one or more receiver platform components are to wake-up.

2. The device of claim 1, further comprising one or more of a transmitter, a receiver, a Wi-Fi PHY module, a Bluetooth PHY module, a Wi-Fi MAC module, a Bluetooth MAC module, one or more antennas, a processor and memory.

3. The device of claim 1, wherein the wake-up signal indicates that the wireless communications device should: wake-up a main radio only, wake-up a main radio and one or more of the one or more receiver platform components, or wake-up the main radio and one or more of the one or more receiver platform components and increase a CPU frequency.

4. The device of claim 3, wherein the platform power management module is further configured to set a small LTR (Latency Tolerance Reporting).

5. The device of claim 1, wherein the platform power management module is further configured to determine an expected platform wake-up time.

6. The device of claim 5, wherein the device is further configured to communicate the expected platform wake-up time to another device.

7. The device of claim 6, wherein the expected platform wake-up time is communicated in a wake-up acknowledgement (ACK).

8. The device of claim 1, wherein the wake-up signal is in a packet with a platform wake-up mode field.

9. The device of claim 1, configured to receive a packet including one or more of a legacy IEEE 802.11 preamble, a wake-up preamble, a receiver ID, a radio wake-up mode field, a length field, a data field and a Frame Check Sequence (FCS) field.

10. The device of claim 1, configured to one or more of save power and reduce latency at least based on the received wake-up signal.

11. A wireless communications method comprising:
receiving, at a wireless device, a wake-up signal; and
selectively waking-up one or more of a receiver radio and one or more receiver platform components, wherein information contained in the wake-up signal specifies which of the one or more of the receiver radio and the one or more receiver platform components are to wake-up.

12. The method of claim 11, wherein the wireless device comprises one or more of a transmitter, a receiver, a Wi-Fi PHY module, a Bluetooth PHY module, a Wi-Fi MAC module, a Bluetooth MAC module, one or more antennas, a processor and memory.

13. The method of claim 11, wherein the wake-up signal indicates that the wireless communications device should: wake-up a main radio only, wake-up a main radio and one or more of the one or more receiver platform components, or wake-up the main radio and one or more of the one or more receiver platform components and increase a CPU frequency.

14. The method of claim 13, further comprising setting a small LTR (Latency Tolerance Reporting).

15. The method of claim 11, further comprising determining an expected platform wake-up time.

16. The method of claim 15, further comprising communicating the expected platform wake-up time to another device.

17. The method of claim 16, wherein the expected platform wake-up time is communicated in a wake-up acknowledgement (ACK).

18. The method of claim 11, wherein the wake-up signal is in a packet with a platform wake-up mode field.

19. The method of claim 11, further comprising receiving a packet including one or more of a legacy IEEE 802.11 preamble, a wake-up preamble, a receiver ID, a radio wake-up mode field, a length field, a data field and a Frame Control Sequence (FCS) field.

20. The method of claim 11, further comprising one or more of saving power and reducing latency at least based on the received wake-up signal.

21. A non-transitory computer-readable information storage media, having stored thereon instructions, that when executed by a processor perform the method of claim 11.

22. A wireless communications device comprising:
means for receiving, at a wireless device, a wake-up signal; and
means for selectively waking-up one or more of a receiver radio and one or more receiver platform components, wherein information contained in the wake-up signal specifies which of the one or more of the receiver radio and the one or more receiver platform components are to wake-up.

23. The device of claim 22, wherein the wireless device comprises one or more of a transmitter, a receiver, a Wi-Fi PHY module, a Bluetooth PHY module, a Wi-Fi MAC module, a Bluetooth MAC module, one or more antennas, a processor and memory.

24. The device of claim 22, wherein the wake-up signal indicates that the wireless communications device should: wake-up a main radio only, wake-up a main radio and one or more of the one or more receiver platform components, or wake-up the main radio and one or more of the one or more receiver platform components and increase a CPU frequency.

25. The device of claim 24, further comprising setting a small LTR (Latency Tolerance Reporting).

* * * * *